United States Patent [19]
Bevilacqua et al.

[11] 3,844,883
[45] Oct. 29, 1974

[54] PRESSURE VESSEL PENETRATION TECHNIQUES

[75] Inventors: Frank Bevilacqua, Windsor; Malcolm D. Groves; Gennaro V. Notari, both of Simsbury, all of Conn.

[73] Assignee: Combustion Engineering, Inc., Windsor, Conn.

[22] Filed: Dec. 23, 1971

[21] Appl. No.: 211,369

[52] U.S. Cl............ 176/36 R, 176/87, 285/28
[51] Int. Cl............................... G21c 7/16
[58] Field of Search......... 176/36 R, 78, 86 R, 87; 285/28, 25, 131

[56] References Cited
UNITED STATES PATENTS

| | | | |
|---|---|---|---|
| 2,705,159 | 3/1955 | Pfau | 285/33 |
| 3,346,459 | 10/1967 | Prince et al. | 176/36 R |
| 3,442,760 | 5/1969 | Rigg | 176/65 X |
| 3,548,077 | 12/1970 | Talley | 138/110 X |
| 3,660,230 | 5/1972 | Bailey, Jr. | 176/36 R |

FOREIGN PATENTS OR APPLICATIONS

| | | | |
|---|---|---|---|
| 1,171,822 | 10/1958 | France | 176/36 R |
| 91,871 | 8/1968 | France | 285/28 |

*Primary Examiner*—Harvey E. Behrend

[57] ABSTRACT

Control line penetration of a nuclear reactor pressure vessel is achieved through the side of the vessel below the junction of the vessel main barrel portion and the reactor head. The control lines enter the pressure vessel in the form of a bundle of conduits at a point which is out of the main coolant flow path and the control lines are provided with disconnect means internally of the vessel.

14 Claims, 13 Drawing Figures

PATENTED OCT 29 1974 3,844,883

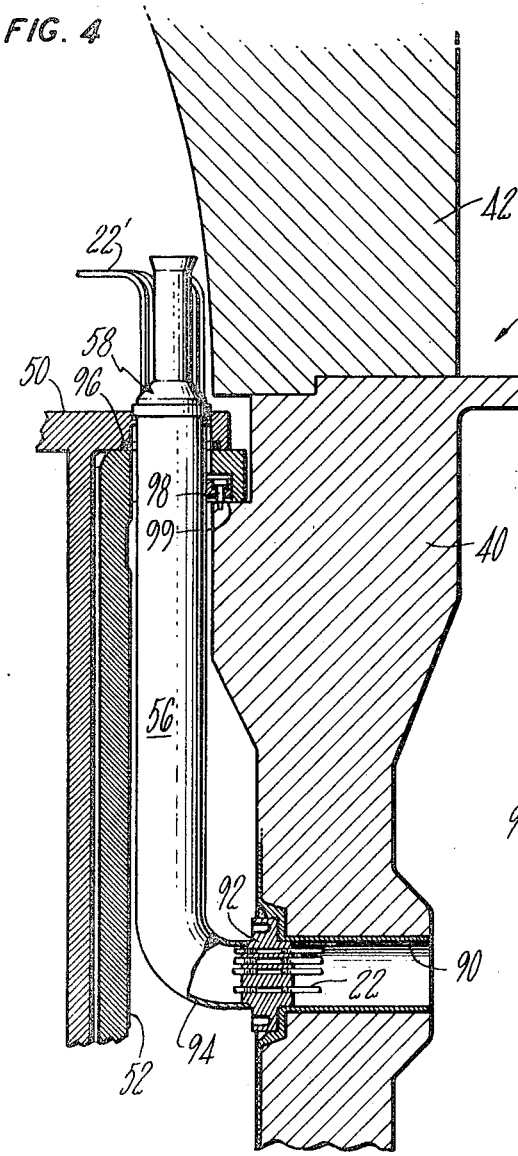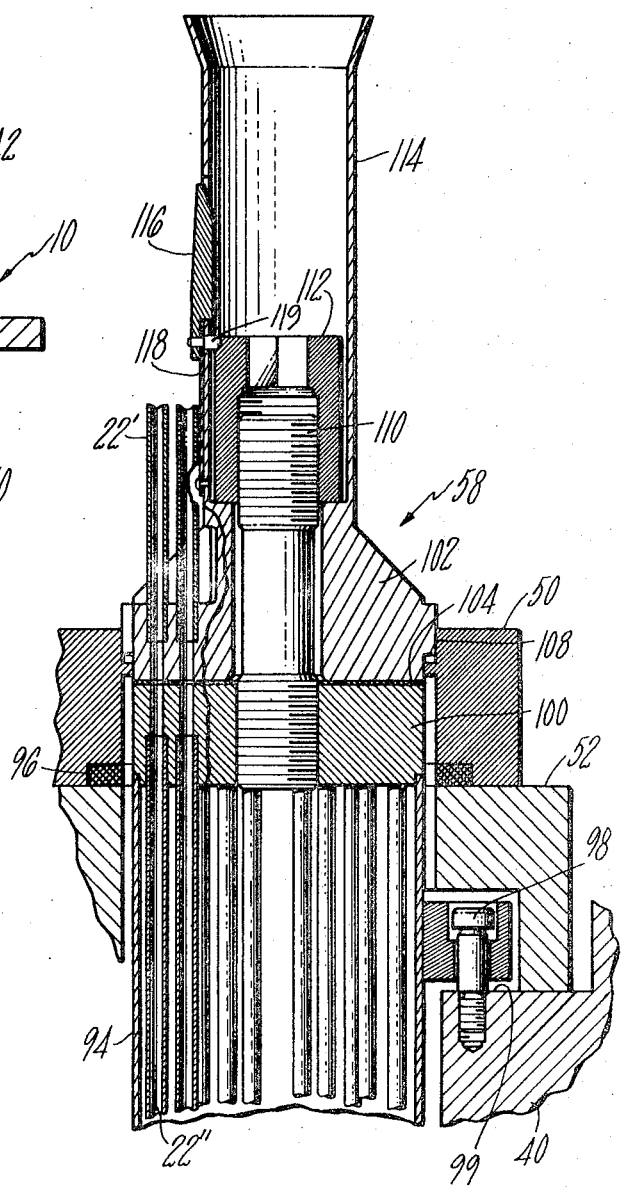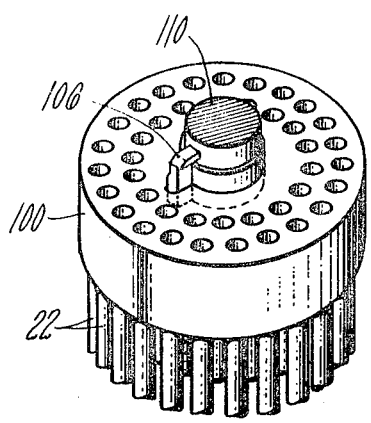

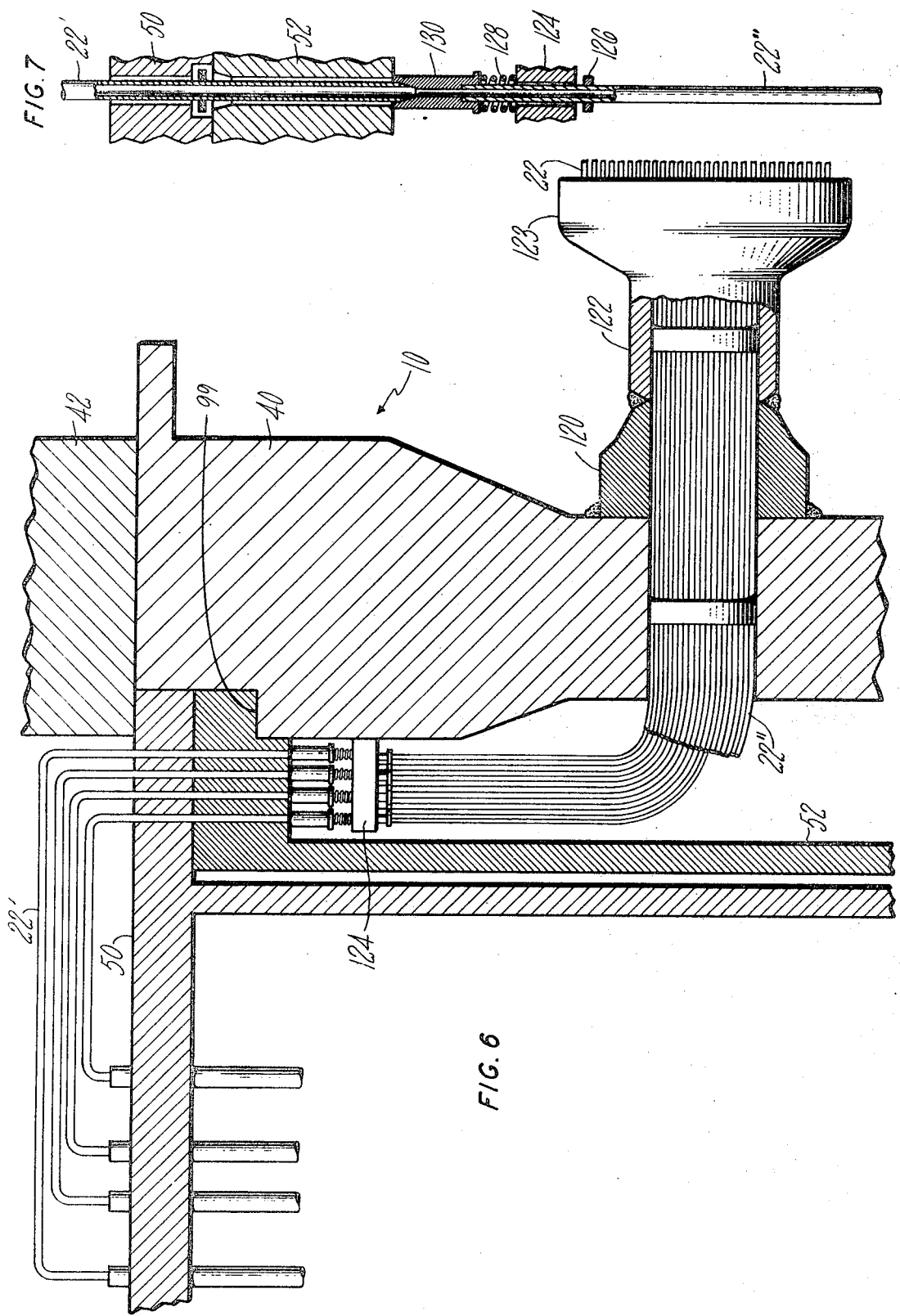

PRESSURE VESSEL PENETRATION TECHNIQUES

BACKGROUND OF THE INVENTION

1. Field of the Invention

The present invention relates to nuclear reactors and particularly to reactor control systems. More specifically, this invention is directed to techniques and apparatus for hydraulic control line penetration of a reactor pressure vessel. Accordingly, the general objects of the present invention are to provide novel and improved methods and apparatus of such character.

2. Description of the Prior Art

In the operation of a nuclear reactor it is requisite that the position of absorber or moderator elements, also known as control rods, with respect to the fuel assembly be constantly monitored and controlled. In the prior art the control assemblies for the absorber elements are typically in the form of cylinders which extend out of the reactor through the pressure vessel head. Extension of the control assembly cylinders out through the vessel head has resulted in a "cluttered" head and has exposed the absorber position control devices to the possibility of physical damage.

As a result of the extension out of the pressure vessel of the actuator cylinders, it has previously been necessary to individually disconnect and disassemble the control devices prior to pressure vessel head removal as is necessary for inspection and maintenance operations such as refueling. This, in turn, has imposed a substantial economic penalty on the reactor operator by increasing reactor "down" time during refueling and other routine maintenance or inspection operations.

SUMMARY OF THE INVENTION

The present invention overcomes the above briefly discussed and other disadvantages of the prior art by providing a novel and improved manner of penetrating a reactor pressure vessel with hydraulic control lines. In accordance with the present invention the control lines, in the form of a bundle of tubes, penetrate the side of the reactor vessel at a point below the junction of the main vessel portion and head. The penetration location is selected so as to be out of the main coolant flow path. In accordance with the preferred embodiments of the invention, internally of the pressure vessel the control lines are positioned in the annulus between the reactor core barrel and the pressure vessel internal wall as they are directed upwardly into the area encompassed by the vessel head. Disconnecting means is provided in a location which is accessible with the head removed whereby the control lines may be readily separated when the core barrel is removed.

As will be obvious from the preceding description, in accordance with the present invention there is no control line penetration of the vessel head thus providing a "clean" head which may be readily removed after unbolting. Accordingly, the penetration in accordance with the invention is located in a comparatively protected area whereby damage is less likely to occur.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 4 is a side elevation view, partially in section, of a first embodiment of a pressure vessel control line penetration technique and apparatus in accordance with the present invention;

FIG. 5 is an enlarged, cross-sectional view of the internal control line disconnect assembly of the apparatus shown in FIG. 4;

FIG. 5A is an enlarged perspective view of a portion of the disconnect assembly of FIG. 5;

FIG. 6 is a cross-sectional, side elevation view of a second embodiment of a pressure vessel control line penetration technique and apparatus in accordance with the present invention;

FIG. 7 is an enlarged, cross-sectional view of the internal control line disconnect assembly of the apparatus shown in FIG. 6;

DESCRIPTION OF THE PREFERRED EMBODIMENTS

Figure 1:
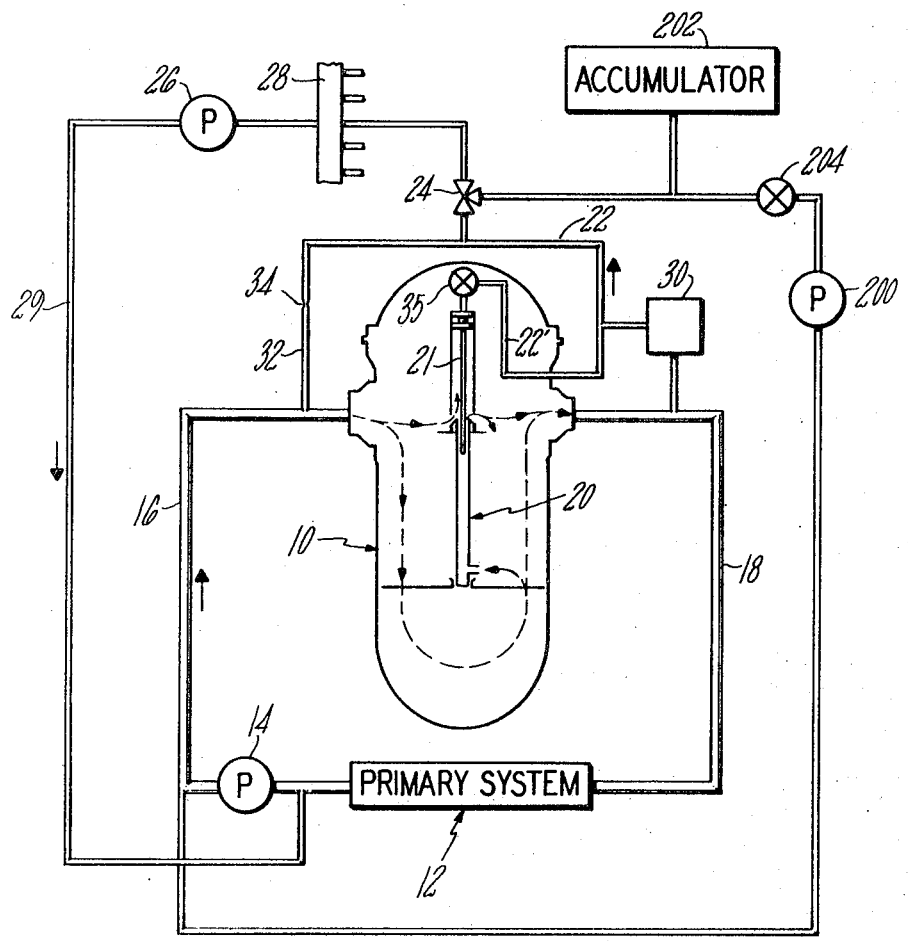
FIG. 1 is a schematic view of a top actuated reactor control system in accordance with the present invention.

With reference now to FIG. 1, the pressure vessel of a pressurized water reactor is indicated generally at 10. Reactor vessel 10 provides a housing for the various elements of a fission type nuclear reactor of the kind employed by utilities to heat a circulating coolant; the coolant thereafter being routed through the heat exchangers and other components of a steam generator and the steam thus provided being employed to drive a turbine and its associated electrical power generator. In FIG. 1 the steam generators and associated equipment have been labeled "Primary System" and are indicated generally at 12. The main circulating pump for the coolant is indicated at 14 and supplies, via conduit or cold leg 16, the coolant to pressure vessel 10. The heated coolant exits from the pressure vessel 10 via conduit or hot leg 18 and is thereafter delivered to Primary System 12.

As is well known in the art, a core assembly including a plurality of fuel rods or elements is positioned within pressure vessel 10. Also positioned within vessel 10, in the interest of controlling the fission rate, are control or absorber rod assemblies; a typical such assembly being indicated schematically and generally at 20 and including an absorber element 21. In accordance with the present invention, each of the control rod assemblies has two operative positions commensurate respectively with full retraction and full insertion of its absorber element into the reactor core. As shown in FIG. 1, and as will be described in greater detail below, absorber element position control is achieved by providing each individual control rod assembly with a hydraulic actuator.

As may be seen from FIG. 1, and as will also be described in greater detail below, each independently controllable control rod assembly in accordance with the present invention is a top actuated device which utilizes hydraulic pressure to determine absorber element position. That is, the position of the absorber elements in accordance with the invention is determined by the application of pressure to the top end of the hydraulic actuator which comprises part of each individual control rod assembly. A plurality of hydraulic control lines, such as line 22–22' associated with control rod assembly 20, will penetrate the pressure vessel and will deliver the control pressure which is applied to the hydraulic actuator of each control rod assembly. Each of control lines 22 will have inserted therein a control valve 24. One side of each of valves 24 is connected to a lift pump 26 via a manifold 28. As may be seen from the flow path indicated in broken lines in FIG. 1, primary coolant delivered to pressure vessel 10 will flow through the individual control rod assemblies and any coolant drawn off by lift pump 26 will be returned via conduit 29 to the main coolant flow path upstream of the main circulating pump 14.

The raising of the absorber elements cannot be accomplished by the main circulating pump 14 alone and is achieved by the opening of valves 24 whereby a lift pressure differential is established across the hydraulic actuators of the control rod assemblies by the combined action of main pump 14 and lift pump 26.

When all of the absorber elements are in the "up" position, as shown in the case of control rod assembly 20 of FIG. 1, the reactor will be operating with maximum power output. The adjustment of reactor output power may be accomplished in accordance with the present invention by controllably inserting or withdrawing individual absorber elements from the core.

Insertion of selected individual absorber elements into the core under normal operating conditions is accomplished by operating valves 24 so as to remove holding pressure from the tops of the selected actuators in the control rod assemblies. Upon the removal of the holding pressure either gravity or the application of pressure to the top of the hydraulic actuator will cause absorber element insertion. Absorber element insertion under emergency conditions, known as a "scram", may be accomplished either by gravity or power or a combination of both.

When power scram and/or power assisted absorber element insertion is desired in addition to gravity insertion, communication is provided from the downstream side of main circulating pump 14 to the control rod assemblies via an auxiliary pump 200. Pump 200 is employed to charge an accumulator 202 and, in the power scram embodiment, valve 24 will be a three-way valve.

It is to be noted that the supplementary flow path including pump 200, accumulator 202 and the associated check valve 204 is not necessary for operation of the invention and the reactor and may be omitted.

Safety requirements dictate that the reactor be provided with external devices for indicating the position of each of the absorber elements. In accordance with the present invention, the position indicating devices are preferably pressure sensitive and are responsive to the pressure difference between the reactor vessel outlet, as measured for convenience in the primary coolant hot leg 18, and the control line 22. One of these P position indicating devices is indicated schematically at 30.

In accordance with the top actuated control techniques of the present invention, the forces of gravity are adequate to insure positive hold down of the absorber elements. While not necessary for operation or to comply with safety requirements, the invention may also be provided with means for hydraulically assisting in the holding of the absorber elements in the down or inserted position. Thus, by including a branch conduit 32 between the cold leg 16 and the control line 22 upstream of valve 24, a small positive pressure acting in the down direction may be applied to the hydraulic actuators in the control rod assemblies. If employed, each of hold down lines 32 will include a flow limiting restriction 34.

While not necessary, if deemed desirable in view of safety considerations, means may be provided to prevent accidental control rod withdrawal in the event of a rupture of the control line 22–22' between the top of the control rod assembly 20 and the control valve 24. This additional safety feature may take the form of a check valve 35. Check valve 35 may comprise a flow rate sensitive hydraulic fuse such as model FVL16A available from Marotta Valve Corporation of Boonton, N.J. The check valve 35 or equivalent device will be installed in the control line adjacent to the control rod assembly and will be responsive to the rate of flow of coolant out of the top of the control rod assembly. The coolant flow rate will, of course, substantially increase in the unlikely event of a control line break. The safety valve will automatically close when the flow rate reaches a selected level in excess of that experienced during normal operation thereby preventing generation of a sufficient pressure differential to cause absorber element withdrawal.

Figure 2:
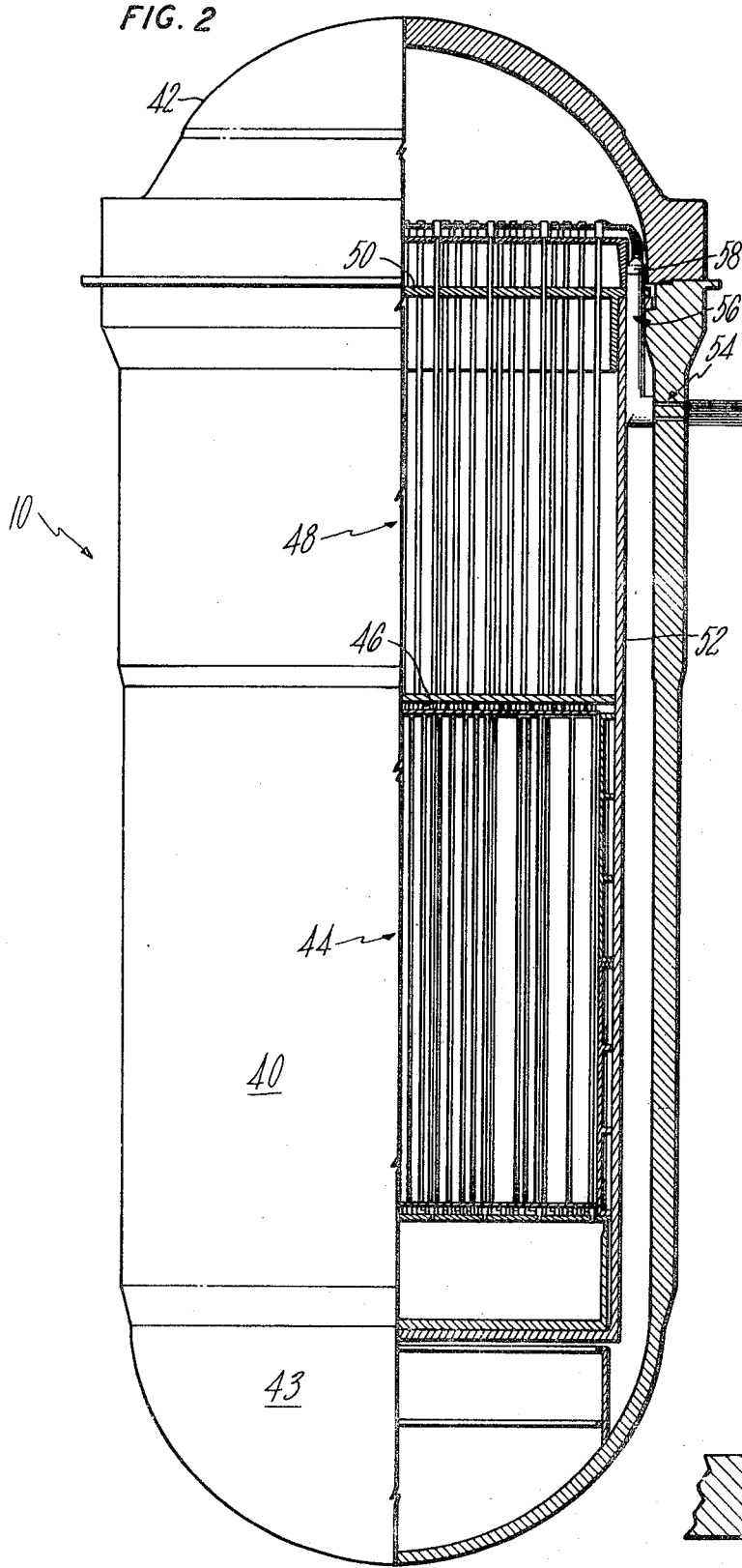
FIG. 2 is an enlarged view, partially in section, of the pressure vessel of the reactor of FIG. 1, FIG. 2 showing generally the placement of the fuel and control elements within the vessel.

Referring now to FIG. 2, the pressure vessel 10, partly broken away to show the fuel and control rod assemblies, may be seen. Pressure vessel 10 includes a main vessel portion 40, the reactor top head 42 and a bottom head 43. A fuel assembly 44, which includes the individual fuel rods and the absorber element guide tubes, is positioned within vessel 10 below a fuel assembly alignment plate 46. An upper guide structure 48, which includes the control rod assemblies, is positioned in vessel 10 above fuel assembly 44 and includes an upper support plate 50 which bridges the top of the core support barrel 52. The head 42 and the upper guide structure 48 must be removable to permit refueling of the reactor and other maintenance. Accordingly, means must be provided for disconnecting the hydraulic control lines such as line 22' of FIG. 1.

As shown in FIG. 2, the control lines penetrate the wall of portion 40 of vessel 10 via a control line penetration indicated generally at 54. Within vessel 10 the control lines are directed, in part via a control line cluster assembly indicated generally at 56, to the tops of the control rod assemblies. A control line disconnect assembly is indicated at 58. Disconnect 58 may be of the multiple seal, single bolt connector type which will be described in detail below in the discussion of FIGS. 5 and 5A.

Figure 3:
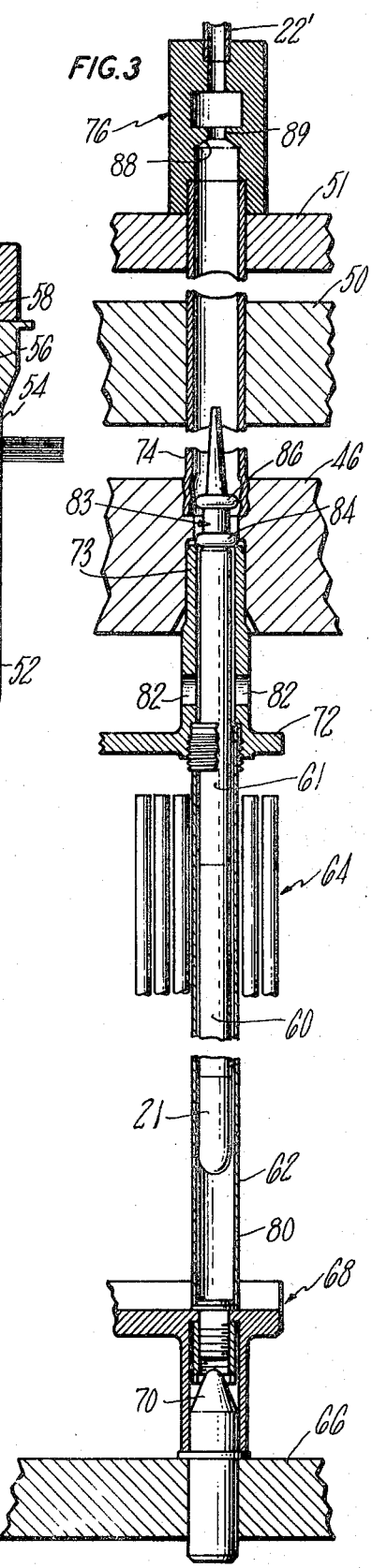
FIG. 3 is a side elevation view, partially in section, of a first embodiment of a control rod assembly in accordance with the present invention.

With reference now to FIG. 3, a control rod assembly in accordance with a first embodiment of the present invention is shown in detail. The absorber element 21 is positioned within a tubular extension 60 of control rod 61 which is in turn mounted within a control rod guide tube 62. The guide tube, as previously noted, passes into the core assembly and forms part of the fuel assembly 44 which also includes the fuel rods or elements indicated generally at 64. At their lower ends the guide tubes, such as guide tube 62, are supported from the core support plate 66 by means of a fuel assembly end fitting indicated generally at 68. Proper positioning of guide tubes is insured through engagement of fitting 68 with fuel bundle alignment pins, such as pin 70, which are mounted from plate 66. At their opposite or upper ends the guide tubes are engaged by the fuel assembly upper end fitting 72. A tubular extension 73 of upper end fitting 72 is received in the fuel assembly alignment plate 46. Fluid communication between guide tube 62 and a hydraulic cylinder 74 is achieved through upper end fitting 72 and plate 46. The hydraulic cylinder 74 is supported by the upper guide structure support plate 50 and by a further upper support plate 51. The hydraulic cylinder 74 terminates, at its upper end, in a lift buffer assembly, indicated generally at 76, which provides communication between the upper end of cylinder 74 and the control line 22'.

Guide tube 62 is provided with a coolant flow port 80. Port 80 may either be in the wall of tube 62 adjacent the fuel assembly lower end fitting 68 as shown or may actually be formed in pin 70 with communication being via the bottom of the tubular extension of fitting 68. Additional flow ports 82 are provided in the tubular extension 73 of the fuel assembly upper end fitting 72. The upper end of the control rod 61 is connected to a lift piston assembly indicated generally at 83. In a preferred embodiment piston 83 includes a pair of spacially displaced discs 84 and 86. With the absorber element in the inserted position shown in FIG. 3, the lower disc 84 is in sealing relationship with a bottom seal defined by the upper end of the tubular extension 73 of upper end fitting 72. The top seal, which is engaged by upper disc 86 with the control rod in the full withdrawn position, is indicated at 88 and is formed on the lift buffer assembly 76.

Figure 3A:
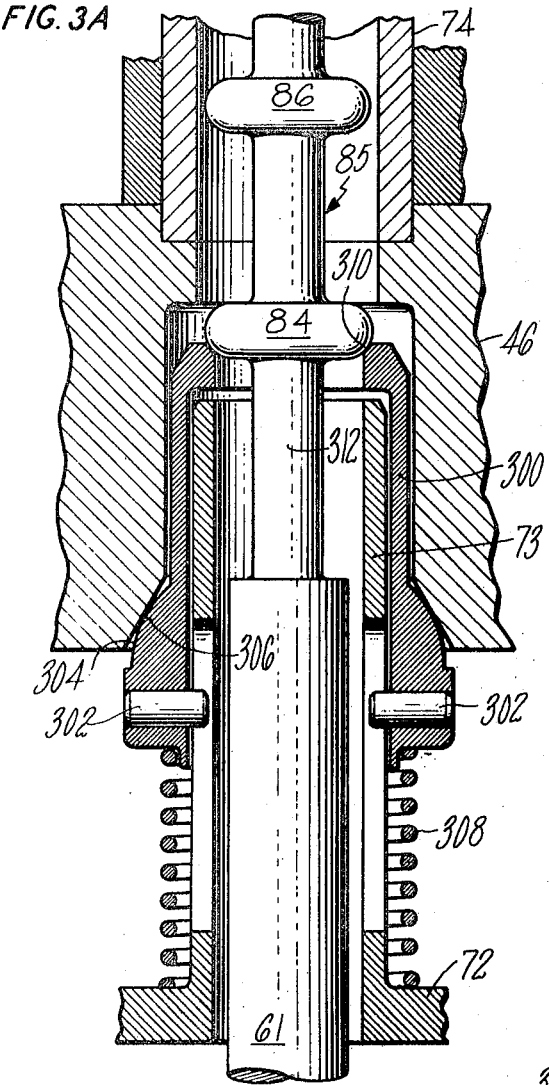
FIG. 3A is an enlarged view of a portion of a preferred embodiment of the control rod assembly of FIG. 3.

With reference now to FIG. 3A, which is an enlarged view of a portion of a preferred embodiment of the control rod assembly of FIG. 3, a number of particularly novel features of the present invention may be seen. Because of its design, the control rod assembly of the present invention may use commercially available tubing for hydraulic cylinder 74. The lift piston discs 84 and 86 are loose fitting within cylinder 74 and thus have large clearances relative to the bore of the cylinder. Also, for reasons which will become apparent from the description to follow, the lift piston discs are provided with rounded edges. Use of off the shelf tubing and the ability to operate with relatively large clearances results in ease of manufacture of the control rod assemblies and low cost. Also, large variations in tube ovality and straightness can be tolerated and contamination such as the build up of scale on the inner walls of cylinder 74 will not have a deleterious effect on operation. The large clearance between the lift piston and walls of cylinder 74, however, requires relatively high lift flows in order to permit raising of the absorber elements. In accordance with the present invention, these high flows can be tolerated because they exist only during the short time periods when a control rod withdrawal is occurring and the flow rates will decrease to a minimal value when lift piston disc 86 is seated at the top of its stroke against top seal 88.

An additional design criteria of the control rod assemblies of the present invention requires that flow port 80 be sufficiently large to permit adequate flow to insure the requisite cooling of the absorber element 60. However, the size of port 80 must also be restricted so that the pressure differential across the reactor core will be taken across the orifice rather than across the control rod; this sizing being necessary to prevent the core $\Delta P$ from shifting the absorber element. Since the size of the absorber element 60-21 and guide tube 62 are fixed by nuclear design criteria, and the size of flow port 80 is selected as noted above, the lift piston discs 84 and 86 must be designed to achieve a minimum gravity scram time. The diameter and shape of discs 84 and 86 are thus adjusted to achieve this scram time. In addition, the spacing between discs 84 and 86 must be such that the characteristics of a high loss piston will result due to pressure recovery between the discs 84 and 86. In designing the piston so as to achieve the desired scram time, it is also important to insure that the piston will have minimum cylinder wall contact areas.

FIG. 3A shows means for providing a fluid seal between the upper end fitting 72 and the fuel assembly alignment plate 46. As may be seen in FIG. 3A, a sleeve 300 is pinned to and positioned about the tubular extension 73 of upper end fitting 72; sleeve 300 being slidably mounted by pins 302 which engage slots in sleeve 73. Sleeve 300 is provided with a convex, and preferably spherical, shoulder 304 which cooperates with a conical enlargement 306 of the aperture in plate 46. In accordance with one embodiment of the invention, the spherical valve element defined by shoulder 304 on sleeve 300 is urged into sealing relationship with the seat defined by the conical surface 306 on plate 46 by means of a loading spring 308. The design of the surfaces 304 and 306 will result in a line of contact or seal and will insure sealing even if there is some slight rotation or misalignment between the various components. The loading spring 308 serves the additional function of holding down the fuel assembly.

The cooperation between surfaces 304 of sleeve 300 and surface 306 of plate 46 as well as the seal between the lower disc 84 of piston 85 and a sealing surface at the top of extension 73 of upper end fitting 72 prevents downward flow of coolant from the interior of the cylinder 74 with the absorber element in the inserted position shown in FIG. 3A. The valve seat 310 preferably has the shape of a segment of a cone and cooperates with the exterior spherical surface on the disc 84 to provide a line of contact seal which will be maintained even if there is slight rotation or canting of the lift piston assembly.

It should also be noted that a mechanical buffer element may be provided between the top of extension 300 and piston 84. Thus, for example, a spring may be installed about the piston shaft 312 which connects the piston assembly to the control rod 61. In a typical example, the spring would be seated against a shoulder on shaft 312 at its upper end and to a sealing plate at its lower end. The piston shaft 312 would pass through the sealing plate and would be movable with respect thereto. The sealing plate would have, at its lower side, a surface which would cooperate with the sealing surface 310 on sleeve 300. In such a configuration the internal sealing would, accordingly, not be achieved by means of direct cooperation between disc 84 and the upper end fitting 72. The spring if employed, would be compressed in decelerating the control rod during a scram only and during such deceleration the piston shaft 312 would slide through the sealing plate.

Figure 3B:
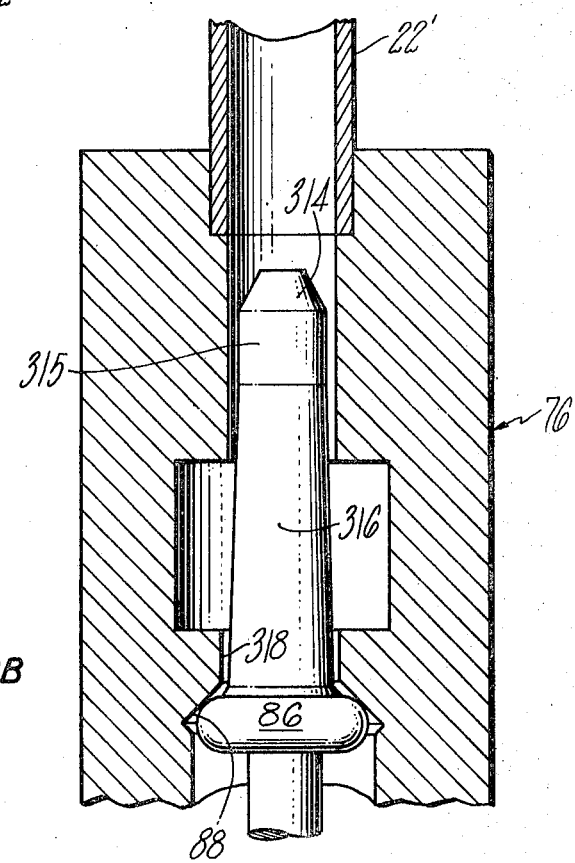
FIG. 3B is an enlarged view of cooperating portions of the top buffer and piston of the control rod assembly of FIG. 3.

With reference to FIG. 3B, details of the piston extension which forms part of the control rod top buffer 76 is shown. The piston extension comprises a flow restrictor having multiple tapers such as shown at 314, 315 and 316. The first or outwardly disposed taper performs only a mechanical lead-in function. The tapered sections 315 and 316 between the mechanical lead-in portion 314 and the upper disc 86 of piston 85 are designed in the manner to be described below. It is to be noted that the top buffer assembly, in cooperation with the flow restricting piston extension, prevents mechanical impact and water hammer pulsations by providing flow reduction which causes deceleration of the control rod in such a manner that flow through control line 22 is substantially shut off prior to the seating of disc 86 against seat 88. The seat 88, as noted, is a conical segment which mates with the spherical surface on disc 86 to define a line of contact with the "valve" closed. The use of a conical seat and cooperating spherical valve element, as also previously noted, permits angular misalignment while still providing an adequate seal. It is understood that either disc 86 or the tapered portion of the plug on the seat 88 may be permitted to float freely between stops on piston 85 in the interest of improving seating in the presence of misalignments.

In the interest of promoting positive seating the flow should be reduced prior to seating and, as noted above, the dynamic lift forces must be converted to static holding forces in such a manner as to prevent water hammer pulsations from developing. These criteria are satisfied by the tapered piston design of the present invention. In designing the plug or piston extension, it is necessary that a maximum size or cross-sectional area be selected so that the minimum force which guarantees seating of the piston is developed. The length and shape of the taper or tapers are thus selected so that the flow reduction and the dynamic to static force transition take place in such a manner and in such a time interval so as to provide a stable condition which minimizes the impact forces and the pressure pulsations generated as a result of the flow shut off. The forces in question are, of course, the summation of the force developed across piston 85 and also the force developed across the section of the piston extension which is within the throat 318 of buffer 76. In accordance with a preferred embodiment of the invention, the plug is of conical shape and tapers in stepwise fashion from a maximum diameter adjacent disc 86 to a minimum diameter at the junction of sections 314 and 315 in accordance with the above noted criteria. It is to be noted that the shape of the plug may be irregular in order to obtain the desired characteristics of movement of the absorber element during the deceleration portion of the control rod withdrawal stroke. Other deceleration means, and particularly mechanical energy absorbing devices, can be mounted on the control rod assembly to provide smooth rod seating if desired.

Considering operation of the control rod actuator of FIG. 3, coolant will normally enter guide tube 62 through flow port 80 and will exit through the flow ports 82. As discussed above, due to the sizing of port 80, the pressure of the coolant on the lower end of tubular housing 60 for absorber element 21 will be insufficient by itself to overcome the forces of gravity and raise the control rod assembly. However, if reactor design criteria so requires, other means can be employed to provide a greater margin against the coolant pressure raising the absorber element. Thus, as briefly noted above, if considered desirable an additional hold-down hydraulic pressure may be applied against the top surface of piston 84 via line 32 in the manner described above in the discussion of FIG. 1. When it is desired to raise the absorber element, communication between the upper end of cylinder 74 and lift pump 26 is established via valve 24 and the pressure differential across lift piston 85 will increase thus unseating disc 84 from seat 310. Once the piston has been unseated, coolant will flow into cylinder 74 through ports 80 and 82 and the pressure differential across the piston will cause the absorber element to continue to move upwardly until disc 86 becomes seated against seat 88.

In accordance with a preferred embodiment, the pressure of the coolant which enters cylinder 74 via ports 80 and 82 will be sufficient to hold the absorber element and its associated hydraulic actuator assembly in the raised position; the down stream pressure being maintained by lift pump 26 and main pump 14 acting together. However, if necessary or desired, lift pump 26 may be intermittently operated and the pressure provided by main pump 14 alone may be utilized to maintain the control rod assembly in the "up" position. When it is desired to reinsert the absorber element under normal operating conditions, valve 24 will be operated in such a manner as to allow the pressure in cylinder 74 to equalize around disc 86. After the pressure has equalized, gravity will cause insertion of the absorber element. During insertion, fluid will be displaced from guide tube 62 via port 80 and by flow upwards in the annulus between control rod 61 and the guide tube 62. Fluid which fills cylinder 74 during insertion enters ports 82 and bypasses discs 84 and 86 until such time as disc 84 becomes seated on the top of tubular extension 73 of upper end fitting 72. As noted above in the discussion of FIG. 1, valve 24 may be a three-way valve so as to permit the application of positive pressure to piston 85 so as to assist the forces of gravity during absorber element insertion.

The FIG. 3 embodiment does not show a separate scram buffer which is employed to decelerate the control rod assembly at the bottom of the down stroke. Scram buffers are generally employed and may take the form of hydromechanical devices located on the top end of tubular extension 73 of upper end fitting 72 or hydraulic devices positioned within guide tube 62 below port 80.

Figure 8:
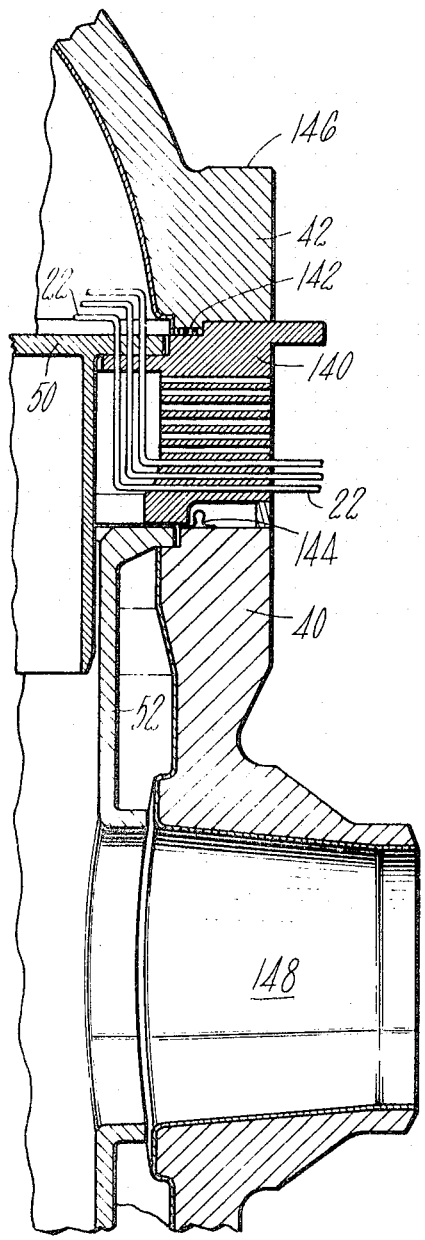
FIG. 8 is a cross-sectional, side elevation view of a third embodiment of a pressure vessel control line penetration technique and apparatus in accordance with the present invention.

A first control line penetration technique in accordance with the present invention is shown in FIG. 4. A preferred embodiment of a control line disconnect mechanism for use with the penetration technique of FIG. 4 is shown in FIGS. 5 and 5A. The penetration technique of FIG. 4 includes an aperture in the wall of pressure vessel portion 40; the aperture being provided with a build up of stainless steel 90. The control lines, such as line 22, pass through the aperture and terminate internally of a multi-apertured plug 92. The external control lines or tubes 22 are brazed, welded or mechanically joined to plug 92 and the plug is seal welded to the inner wall of the pressure vessel whereby a liquid-gas separation between th interior of the vessel and the atmosphere is provided. Plug 92 may be comprised of matching plates with the outer plate being welded to the vessel and the plates thereafter being mechanically held together to form an assembly similar to the disconnect device to be described below in the discussion of FIG. 5. It is to be noted that the location of the vessel side wall penetration is preferably above the primary nozzle through which coolant is delivered to the interior of the vessel. This location of the penetration is depicted in FIGS. 1 and 8.

After penetrating the pressure vessel wall, the internal control lines 22' are directed upwardly toward the junction of head 42 and the main vessel portion 40. The control lines are routed within the control line cluster assembly 56 which includes an inner tube shroud 94. Shroud 94 protects the tubular control lines from cross flow and vibration which would otherwise result from direct impingement of the coolant thereon. The control line cluster assembly is positioned between the inner wall of vessel portion 40 and the core support barrel 52. At the top of shroud 94 the control line cluster assembly is provided with a multiple seal, single bolt connector 58. The control line coupling portions of connector 58 are located in an aperture provided therefor in the upper guide structure support plate 50 and it is to be noted that a sealing ring 96 is provided between plate 50 and the core support barrel 52 to prevent leakage of coolant past connector 50 and up into the vessel head 42. A pin 98 locates shroud 94 relative to the vessel and takes up restraining torque during assembly and disassembly. Pin 98 engages an aperture in an internal flange 99 provided on pressure vessel portion 40.

With reference now to FIG. 5, an enlarged cross-sectional view of multiple seal single bolt connector 58 is shown. Connector 58 includes a lower flange 100, an upper flange 102 and, positioned therebetween, a multiple seal plate 104. The multiple seal plate 104 will typically comprise a compressible metal plate assembly which is keyed into position, by a key 106 formed integral with flange 100, whereby the apertures therein are aligned with the passages defined by the aligned holes in the upper and lower flanges 102 and 100. The internal control lines 22' and the control line segments 22'', which extend between plug 92 and connector 58, are brazed or otherwise connected in sealing relationship to apertures in respective flanges 102 and 100 as shown whereby the disconnect assembly functions as a portion of a plurality of control lines when in the assembled position. An enlarged perspective view of the lower flange 100 is shown in FIG. 5A. The details of the key 106 are clearly shown in FIG. 5A. The configuration of key 106 is such that, upon disconnecting the control lines, the seal 104 will remain in position on lower flange 100.

Upper flange 102 of connector 58 is provided with one or more torque lugs 108 which are keyed into the upper guide plate 50 to both locate the connector assembly 58 and also to prevent turning of flange 102 during assembly and disassembly operations. Flange 102 thus is seated in a pilot hole in upper guide structure support plate 50 and will come off with plate 50 during a disassembly operation. With connector 58 in the assembled position, the upper and lower flanges are held together by a stud 110 and a retainer nut 112. The stud 110 is threadably engaged in the lower flange 100 and, in turn, is engaged by the retainer nut 112 which is tightened down against an internal flange provided at the top of the main body portion of upper flange 102. The upper flange 102 is also provided with a tubular extension 114 which functions as a tool guide during assembly and disassembly operations. A tool inserted in extension 114 will be directed into the hexagonal recess provided in the upper end of retainer nut 112 whereby the retainer nut may be removed and the upper flange 102 thereafter separated from the seal plate 104 and lower flange 100 when the upper guide structure support plate 50 is removed.

It is to be noted that the single bolt connector 58 is also provided with a spring loaded locking device which comprises locking member 116 and associated spring 118. A pin 119 on locking member 116 engages a groove at the top of retainer nut 112 whereby the locking device prevents rotation of nut 112 as could otherwise result from vibrations encountered during normal reactor operation. The tool used to remove and tighten retainer nut 112 is configured so as to push locking member 116 outwardly to thereby disengage pin 119 from the cooperating groove in nut 112 when the tool is inserted.

FIGS. 6 and 7 respectively depict an alternate pressure vessel penetration technique and a second embodiment of a disconnect mechanism in accordance with the present invention. It is to be noted, however, that the disconnect mechanism of FIG. 5 may be employed with the penetration technique of FIG. 6 and the disconnect mechanism shown in detail in FIG. 7 may be employed with the penetration technique of FIG. 4. The penetration scheme of FIG. 6 differs from that of FIG. 4 primarily in the fact that the control lines 22 are continuous where they pass through the wall of the main portion 40 of the pressure vessel. In the FIG. 4 embodiment the tubes defining the control lines were broken at the plug 92 whereby the plug defined the high pressure boundary or liquid-gas interface. Thus in the FIG. 4 embodiment, apertures in the plug defined fluid flow paths between the control line portions which were located at atmospheric pressure externally of the pressure vessel and the control line segments internally of the vessel and exposed to the pressurized coolant. In the FIG. 7 embodiment the control lines will be brought to the apertured pressure vessel wall in the form of a bundle of tubes and the tube bundle will be supported at the wall by means of a flange 120 which is welded to the external wall of the pressure vessel. The flange 120 is also welded to an external protective shroud 122 which supports and guides the tube bundle to an integral, apertured, external flange 123. In the FIG. 7 embodiment the primary seal is provided by joining, by suitable means, the internal tubes 22'' and the external tubes 22 to flange 123 whereby the tubes on the vessel side of the flange will be exposed to the pressurized coolant and the tubes to the other side of flange 123 are exposed to the atmosphere. Alternatively, the hydraulic control lines may be brought out through the walls of shroud 122 and the end of the shroud would be provided with a plug rather than apertured flange 123.

Although not shown in FIG. 6, an inner tube shroud, such as shroud 94 of FIG. 4, will also be provided and will extend between the inner wall of the pressure vessel adjacent the penetration up to a support plate 124. The spring loaded disconnect mechanism of FIG. 7 will be positioned above support plate 124 and will be described in detail below. Above the disconnect mechanism the control line continuations 22' will pass upwardly through the flange at the top of the core support barrel 52 and also through the upper guide structure support plate 50 as shown.

Referring now to FIG. 7, it may be seen that the disconnect mechanism of FIGS. 6 and 7 includes spring loaded devices which couple each individual control line 22 to an associated control line extension 22'. The coupling mechanism in each case includes a retainer 126 permanently attached to each of the control lines beneath support plate 124. Each coupling mechanism also includes a spring 128 and a tube seal 130. The lower ends of the control line extensions 22' are provided with an outer taper and the upper ends of the tube seals 130 are provided with a complementary internal taper; the tapered surfaces providing sealing contact between the tubular control line extensions and tube seals. The upper end of each vessel penetrating control line 22 is received in a socket provided therefor at the bottom of a tube seal 130 and the control lines are brazed to the tube seals thereby providing leak tight permanent connections. It will be observed that each control line, such as line 22 of FIG. 7, passes through support plate 124 and is movable axially with respect thereto. The springs 128 load the seals 130 against the control line extensions which extend downwardly through the core support barrel flange and the upper guide structure flange as shown.

During a refueling operation, the pressure vessel head 42 will be removed and the upper guide structure will thereafter be lifted out of the pressure vessel. Upon upper guide structure removal the disconnect mechanisms of FIG. 7 will automatically separate the control lines and, after refueling, the control lines will be automatically reconnected merely by insuring proper alignment as the upper guide structure is repositioned with its supporting flange on the internal pressure vessel supporting shoulder 99. In accordance with side penetration techniques of the present invention, the location of the disconnect mechanism below flange 99 permits the reactor internals; i.e., the core barrel and core; to be removed for inspection and maintenance.

FIG. 8 depicts a third embodiment of a pressure vessel penetration technique in accordance with the present invention. In the FIG. 8 approach a ring known as a "dutchman" is positioned between the top of the main pressure vessel portion 40 and the head 42. The dutchman is indicated at 140 in FIG. 8. When the dutchman approach is employed it is unnecessary to provide for a disconnect mechanism or mechanisms internally of the pressure vessel. Rather, each of the control lines will be severed, typically by the use of standard connectors, externally of the pressure vessel and the dutchman and upper guide structure will be removed from the pressure vessel together.

The penetration technique of FIG. 8 also includes a pair of primary pressure seals 142 and 144 which respectively provide a fluid tight seal between dutchman 140 and head 42 and between the dutchman and the main pressure vessel portion 40. The dutchman is held in position by a plurality of closure bolts, not shown, which extend downwardly from an external flange 146 on head 42 through the dutchman and into the top of main vessel portion 40. The control lines 22 will be dispersed about the periphery of the vessel so as to pass through dutchman 140 without interference with the closure bolts.

FIG. 8 also shows the primary nozzle 148 through which the coolant is delivered to the vessel. As noted above, the control line penetration will preferably, in the interest of isolating the lines from undue stresses caused by the relatively large volume of primary coolant flow, be located above nozzle 148.

Figure 9:
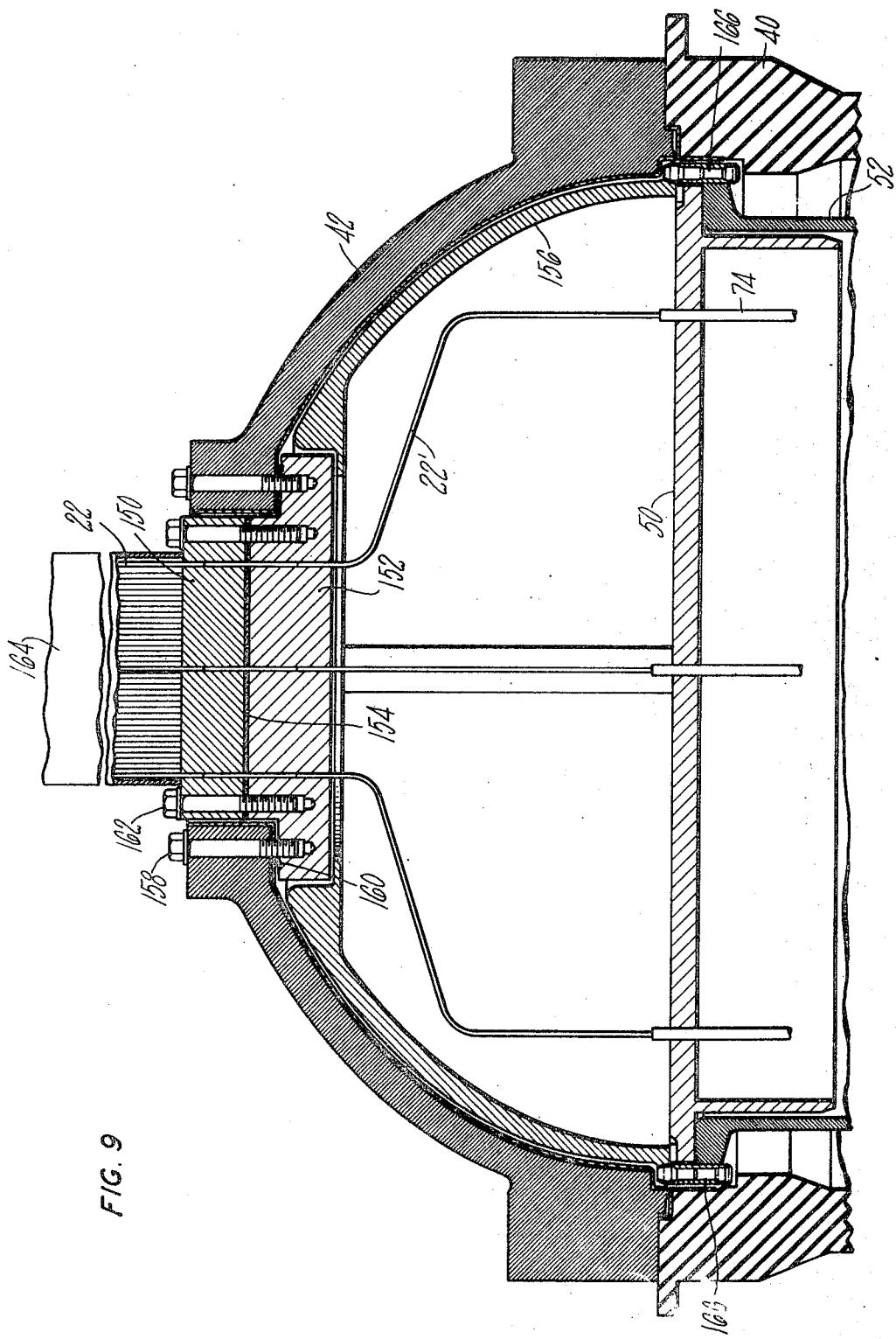
FIG. 9 is a cross-sectional, side elevation view of a fourth embodiment of a pressure vessel control line penetration technique and apparatus in accordance with the present invention.

FIG. 9 shows a fourth reactor vessel penetration technique in accordance with the present invention. In the FIG. 9 embodiment the control lines enter the pressure vessel through the vessel top head 42. In order to permit penetration, the head is provided with an aperture which receives a multiple seal assembly which is similar to the disconnect assembly 58 of FIG. 5. That is, the vessel penetration of FIG. 9 includes an upper flange member 150 and a lower flange member 152. Both of the upper and lower flange members are provided with a number of apertures commensurate with the number of control lines and the flanges are separated by an apertured multiple seal plate 154; the apertures in the upper and lower flanges and the seal plate being in registration with the penetration apparatus assembled as shown. The penetration apparatus is mounted above on a flange support assembly 156 located internally of the pressure vessel. Assembly 156 is in turn supported on the upper support plate 50. The lower flange 152 is supported from head 42 by means of seal bolts 158 and is held tightly against the head thus providing, through the use of a compressible seal 160, a fluid tight connection. Upper flange 150 is bolted to lower flange 152 by means of seal bolts 162 whereby the multiple seal plate 154 is compressed between the flanges. Externally of the pressure vessel the control lines, such as line 22, are protected by a shroud 164 and the individual control lines are terminated within the upper flange 150 to which they are brazed or otherwise attached by means which provide a fluid tight connection. Fluid communication between the ends of the external control lines located within the upper flange 150 and the internal control lines, such as line 22', is provided by the upper flange, the seal plate 154 and a portion of the apertures in the lower flange 152. The internal control line extensions 22' are brazed or otherwise connected in a fluid type manner to the appropriate apertures in flange 152. Accordingly, continuous and leak-proof control lines are provided from the control valves located externally of the pressure vessel through the wall of the vessel to the hydraulic cylinders 74 of the control rod actuators. The proper alignment between the upper and lower flanges and the multiple seal plate 154 is achieved by means of bolts 162 and alignment between the flange support assembly 156 and the core barrel 52 and the upper guide structure support plate 50 is achieved by means of alignment keys 166.

It is to be observed that a penetration scheme similar to that shown in FIG. 9 may be employed in the top actuated control system of the present invention wherein the control lines enter the pressure vessel through the bottom thereof. In the case of bottom penetration, however, the upper flange member 150 is omitted and apertures are provided in the pressure vessel bottom head 43 itself.

Figure 10:
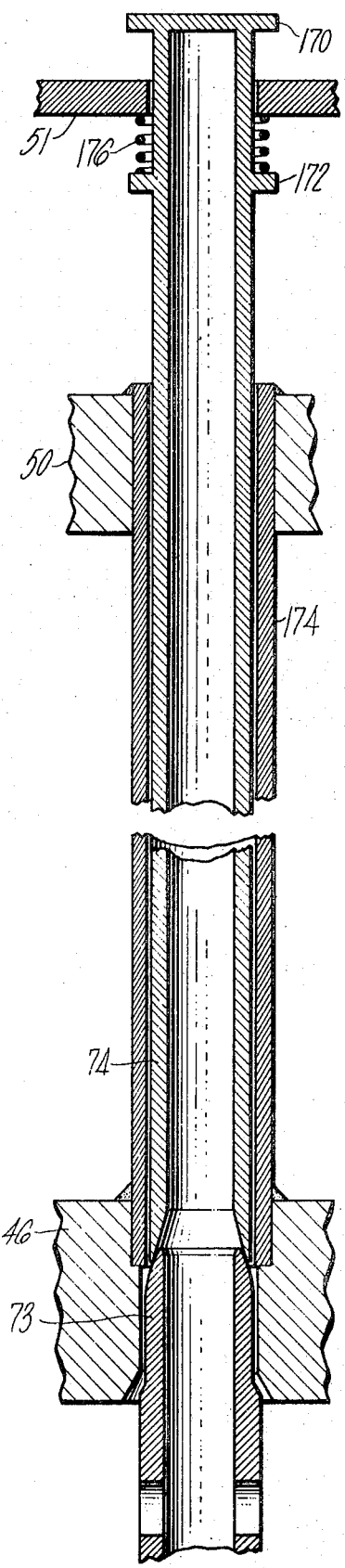
FIG. 10 is a cross-sectional, side elevation view of a fuel assembly hold down scheme and apparatus in accordance with the invention.

FIG. 10 depicts a fuel bundle hold down technique in accordance with the present invention. As is well known, in view of the upwardly directed pressure exerted by the large volume of coolant circulated through the core and also because of the vibrations encountered during operation, means are needed to positively hold down the fuel elements which are mounted below the fuel assembly alignment plate 46. In accordance with the invention, means for holding down the fuel elements may, with the exception of the pistons and associated hydraulic circuitry, be substantially the same as the apparatus for controlling the position of the absorber elements. Thus, the hydraulic cylinder 74 may be allowed to float freely between a pair of stops defined by external flanges 170 and 172 respectively positioned at and adjacent to the upper end of cylinder 74. The lower end of cylinder 74 may be provided with an inner taper which is complementary to an outer taper on the upper end of extension 73 of upper end fitting 72. Regardless of whether sealing is desired, the lower end of cylinder 74 will be urged against the upper end fitting extension. When the apparatus of FIG. 10 is used for fuel element hold down purposes, there will typically be five devices employed to hold down each individual fuel element bundle which may, for example, comprise 250 or more individual tubes which contain the pellets of fissionable material which comprise the fuel. The cylinder 74, which as noted is free floating, is positioned within an upper guide structure support tube 174. Tube 174 is a load bearing element extending between and being joined to fuel assembly alignment plate 46 and upper guide structure support plate 50. The weight of cylinder 74 will typically be selected so that the fuel hold down may be accomplished solely by reliance upon gravity. However, if deemed desirable, a spring 176 may be inserted between plate 51 and the lower flange 172 so as to assist in mechanical hold down. When the apparatus is used for fuel assembly hold down purposes, the tops of cylinder 74 will be sealed. If used for control purposes, the tops of the cylinders would be formed as shown in FIG. 3B and a hydraulic piston assembly will be located within the cylinder.

The apparatus of FIG. 10 may also be employed with the prior art type of ganged control rod assembly. In a ganged rod arrangement, however, the tube 174 and cylinder 74 would be slit.

While preferred embodiments have been described, various modifications and substitutions can be made without departing from the spirit and scope of the present invention. Accordingly, this invention has been described by way of illustration and not limitation.

We claim:

1. In a nuclear reactor, the reactor having a fuel assembly including fissionable fuel elements and neutron absorber elements movable with respect to the fuel elements, the fuel assembly and fluid responsive actuators for positioning the absorber elements being positioned within a pressure vessel, the actuators including piston means coupled to the absorber elements, the pressure vessel having a main portion and a removable head, the improvement comprising:

a first plurality of conduits commensurate in number with all of the absorber element actuators present in the reactor, said first plurality of conduits being located externally of the pressure vessel and having fluidic actuator position control signals applied to first ends thereof, the second ends of said conduits of said first plurality being formed into a bundle of tubular members closely positioned to one another;

a second plurality of conduits commensurate in number with said first plurality of conduits, said second plurality of conduits being located internally of the pressure vessel and having first ends coupled to respective absorber element actuators, the second ends of said conduits of said second plurality being formed into a bundle of tubular members closely positioned to one another; and means for coupling the second ends of each of said first plurality of conduits to the second ends of respective of said second plurality of conduits, said coupling means passing through the wall of the pressure vessel main portion and defining a liquid-gas separation between the interior and exterior of the pressure vessel whereby absorber element position control signals generated externally of the pressure vessel may be applied to the fluid responsive actuators at one side only of the actuator pistons, said coupling means being associated with an aperture in the pressure vessel main portion wall and comprising:

plug means sealed to the pressure vessel main portion wall about the periphery of the aperture therein, said plug means having a plurality of passages therethrough, the second ends of said conduits of said first plurality being terminated in respective of said plug means passages adjacent the exterior side thereof;

connector means positioned internally of the pressure vessel, said connector means having a plurality of passages therethrough, said second ends of the second plurality of conduits being connected to respective of said connector means passages; and a third plurality of conduits extending between the pressure vessel side of said plug means and said connector means, said third plurality of conduits being terminated at first ends in respective of said plug means passages whereby said plug means provides continuous communication between the individual conduits of said first and third pluralities, the second ends of said conduits of said third plurality being coupled to the second ends of respective of said second plurality of conduits by respective passages in said connector means.

2. The apparatus of claim 1 wherein the reactor fuel assembly is positioned within a core barrel, the core barrel being removably supported within and spacially displaced from the pressure vessel, and wherein said connector means and plug means are vertically displaced and said third plurality of conduits is located in the space between the core barrel and pressure vessel.

3. The apparatus of claim 2 further comprising:
shroud means surrounding and protecting said third plurality of conduits.

4. The apparatus of claim 1 further comprising:

shroud means surrounding and protecting said third plurality of conduits.

5. The apparatus of claim 1 wherein said connector means comprises:
multiple seal disconnect means for simultaneously interrupting and reestablishing communication between the conduits of said second and third pluralities.

6. The apparatus of claim 3 wherein said connector means comprises:
multiple seal disconnect means for simultaneously interrupting and reestablishing communication between the conduits of said second and third pluralities.

7. The apparatus of claim 1 wherein a liquid coolant is circulated through the reactor pressure vessel and nozzle means is provided in the pressure wall for discharging the coolant into the pressure vessel, said coupling means being positioned above the coolant discharge nozzle means whereby said coupling means is disposed in a location which is out of the main reactor coolant flow path.

8. The apparatus of claim 3 wherein a liquid coolant is circulated through the reactor pressure vessel and nozzle means is provided in the pressure wall for discharging the coolant into the pressure vessel, said coupling means being positioned above the coolant discharge nozzle means whereby said coupling means is disposed in a location which is out of the main reactor coolant flow path.

9. The apparatus of claim 6 wherein a liquid coolant is circulated through the reactor pressure vessel and nozzle means is provided in the pressure wall for discharging the coolant into the pressure vessel, said coupling means being positioned above the coolant discharge nozzle means whereby said coupling means is disposed in a location which is out of the main reactor coolant flow path.

10. The apparatus of claim 2 wherein said connector means is positioned above said plug means and substantially at the level of the junction of the pressure vessel head and body portions whereby said connector means is accessible with the pressure vessel head removed.

11. The apparatus of claim 6 wherein said multiple seal disconnect means is positioned above said plug means and substantially at the level of the junction of the pressure vessel head and body portions whereby said multiple seal disconnect means is accessible with the pressure vessel head removed.

12. The apparatus of claim 9 whereby said multiple seal disconnect means is positioned above said plug means and substantially at the level of the junction of the pressure vessel head and body portions whereby said multiple seal disconnect means is accessible with the pressure vessel head removed.

13. The apparatus of claim 5 wherein said disconnect means comprises:
movable seal means, said seal means being permanently connected to the second ends of the conduits of said third plurality and releasably engaging the second ends of the conduits of said second plurality;
means for resiliently urging said seal means into leak proof engagement with the conduits of said second plurality; and
means limiting the movement of said seal means whereby the conduits of said second plurality may be withdrawn from said seal means upon removal of the reactor core barrel.

14. The apparatus of claim 9 wherein said disconnect means comprises:
movable seal means, said seal means being permanently connected to the second ends of the conduits of said third plurality and releasably engaging the second ends of the conduits of said second plurality.
means for resiliently urging said seal means into leak proof engagement with the conduits of said second plurality; and
means limiting the movement of said seal means whereby the conduits of said second plurality may be withdrawn from said seal means upon removal of the reactor core barrel.

* * * * *